United States Patent [19]

Itoh et al.

[11] 4,258,950
[45] Mar. 31, 1981

[54] VEHICLE BODY CONSTRUCTION AND METHOD OF OBTAINING SAME

[75] Inventors: Hiroshi Itoh, Tokyo; Yoshimasa Tuchiya, Sayama; Yoshinori Katayama, Tokyo, all of Japan

[73] Assignee: Nissan Motor Company, Limited, Yokohama, Japan

[21] Appl. No.: 63,367

[22] Filed: Aug. 3, 1979

[30] Foreign Application Priority Data

Aug. 7, 1978 [JP] Japan .................................. 53-95449

[51] Int. Cl.³ .............................................. B62D 25/00
[52] U.S. Cl. ........................................ 296/56; 49/485; 296/106
[58] Field of Search .................... 296/50, 56, 106, 146; 49/400, 401, 485

[56] References Cited
U.S. PATENT DOCUMENTS

2,769,659  11/1956  Perry ....................................... 49/485

*Primary Examiner*—John J. Love
*Assistant Examiner*—John A. Carroll
*Attorney, Agent, or Firm*—Schwartz, Jeffery, Schwaab, Mack, Blumenthal & Koch

[57] ABSTRACT

Disclosed are a roof panel and a rear fender outer panel have flange portions, respectively. The flange portions define sides of a back door receiving opening. The roof panel and the rear fender outer panel are respectively fitted with support members which are constructed and arranged to cooperate with the flange portions, a weather strip and a frame of a back door assembly to define adjacent said receiving opening a drip trough the depth of which is larger than its width. The frame of the back door assembly is constructed and arranged to have a box-like section including a bottom side and to engage the weather strip at the wall portion defining the bottom side whereby the frame is markedly reduced in width, resulting in an increased vision area of a glass panel of the back door assembly and therefore an improved visibility as well as an improved appearance.

12 Claims, 16 Drawing Figures

| PRESS FORMING PROCESS | REAR FENDER OUTER PANEL FOR VEHICLE BODY WITH FIXED REAR WINDOW | REAR FENDER OUTER PANEL FOR VEHICLE BODY WITH BACH DOOR |
|---|---|---|
| DRAWING | | |
| TRIMING | | |
| RESTRIKING | | |
| FLANGING | | |
| SHAPE OF FINISHED PRESSED PART | | |

VEHICLE BODY CONSTRUCTION AND METHOD OF OBTAINING SAME

BACKGROUND OF THE INVENTION

This invention relates to vehicle body constructions, and more particularly to a vehicle body construction having a back door-receiving opening and a drip trough adjacent the opening. Further this invention relates to a method of obtaining a vehicle body construction of the type adapted for having a back door assembly on the basis of a vehicle body construction of the type adapted for having a fixed rear window.

In order to meet the various demands of the automotive market, it is usual for automobile manufacturers to produce a series of automobile models based on a single basic chassis. For example, manufacturers usually offer a sedan, a hatchback, a coupe, a station wagon, etc. For the convenience of production of these models, it is essential to make use of the same parts and manufacturing processes as much as possible.

FIGS. 3 to 6 show two types of prior art vehicle body constructions—the type having a fixed rear window and the type having a back door—in which some of the parts employed therein are identical to each other.

Figure 1:
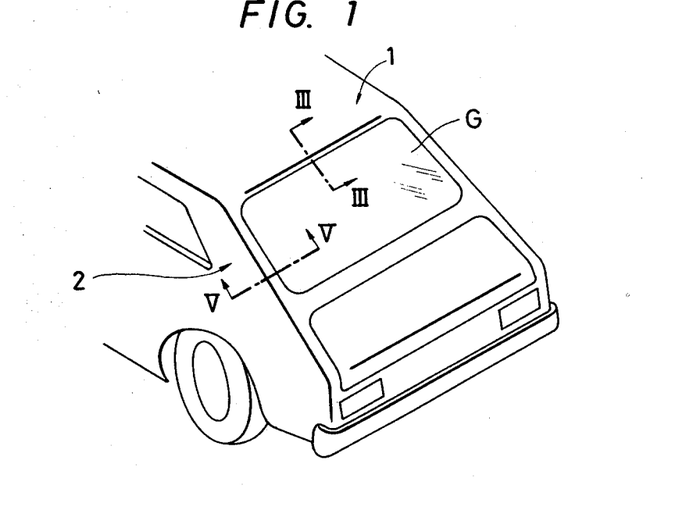
FIG. 1 is a perspective view showing a rear part of a vehicle of the type having a fixed rear window.
Figure 2:
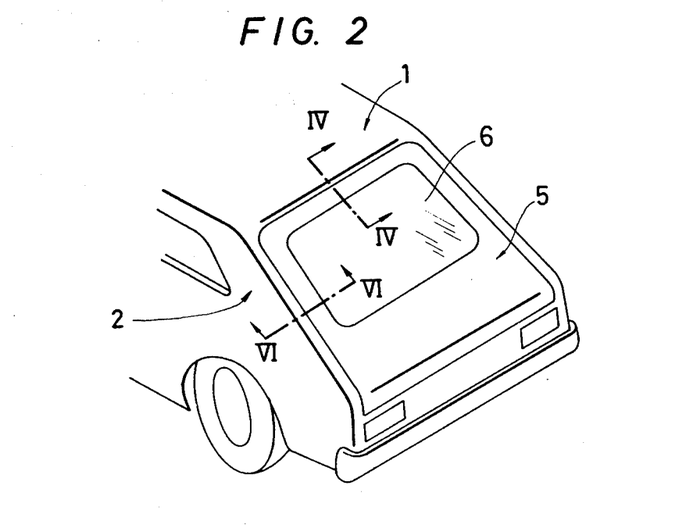
FIG. 2 is a perspective view showing a rear part of a vehicle of the type having a back door assembly.
Figure 3:
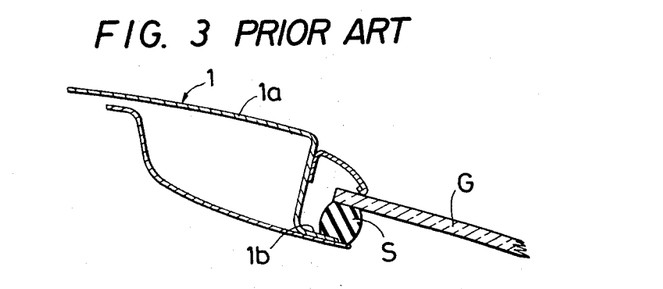
FIGS. 3 and 5 are sectional views taken generally along the lines III—III and V—V of FIG. 1, respectively, showing a prior art vehicle body construction of the type having a fixed rear window with which the present invention is concerned.
Figure 4:
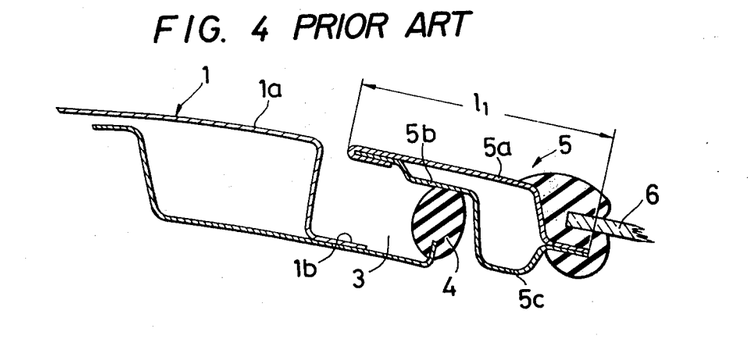
FIGS. 4 and 6 are sectional views taken generally along the lines IV—IV and VI—VI of FIG. 2, respectively, showing a prior art vehicle body construction of the type having a back door assembly with which the present invention is concerned.
Figure 5:
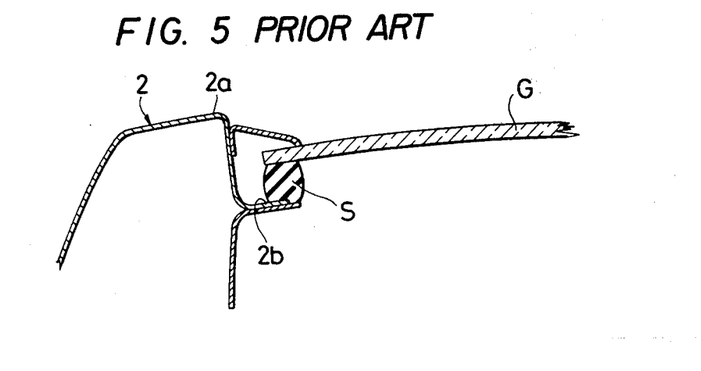
Figure 6:
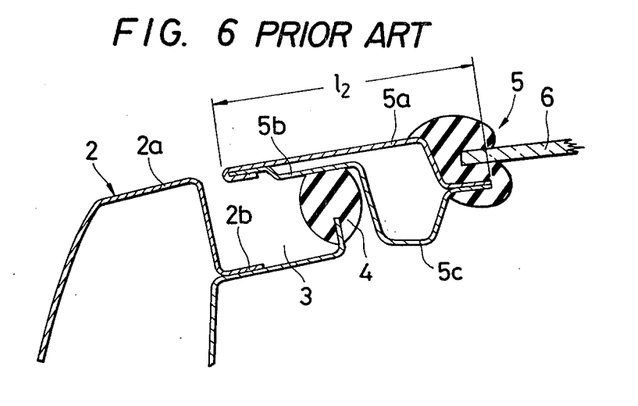

That is, FIGS. 3 and 5 are sectional views showing a rear part of a vehicle body construction of the type having a fixed rear window, and FIGS. 4 and 6 are sectional views showing a rear part of a vehicle body construction of the type having a back door assembly. As seen from the drawings, the vehicle body constructions are adapted to make use of the same roof panels 1 and rear fender outer panels 2. That is, each of the roof panels 1 has an outer exterior portion $1a$ defining the outer body of the vehicle and a bottom wall portion $1b$ spaced inwardly from the outer exterior portion $1a$ by an amount which is equal to that in the case of the other roof panel. Similarly, each of rear fender outer panels 2 has an outer exterior portion $2a$ defining the outer body of the vehicle and a bottom wall portion $2b$ spaced inwardly from the outer exterior portion $2a$ by an amount which is equal to that of the other rear fender outer panel. In the drawings, designated by the reference character G is a rear window glass panel, by S a sealant-adhesive, by 4 a weather strip, by 5 a back door assembly and by 6 a glass panel of the back door assembly 5. The vehicle body construction of the type having a back door assembly 5 shown in FIGS. 4 and 6 is provided with a drip channel or trough 3 for assuring the water-tightness of the vehicle body. The drip trough 3 is required for its intended purpose, to have a sufficiently large cross sectional area. However, the drip through 3 cannot be deepened since its depth is determined by the distance between the outer exterior portion $1a$ and the bottom wall portion $1b$ of the roof panel 1 which is also used in the vehicle body construction of the type having the fixed rear window shown in FIGS. 3 and 5. The drip trough is thus widened so as to have a sufficiently large cross sectional area, resulting in its having a width which is larger than its depth as shown. Because of the drip trough 3 thus shaped, the back door assembly 5 has a frame $5a$ which requires a thin, flat portion $5b$ for engagement with the weather strip 4 and an enlarged cross sectional portion $5c$ next to the thin, flat portion $5b$ to provide a sufficient rigidity of the frame $5a$. The vehicle body construction of the type having a back door assembly as described above, encounters a drawback in that the widths $1_1$ and $1_2$ of the frame $5a$ are inclined to be considerably large thus resulting in a narrow vision area from the glass panel 6 and therefore a poor visibility of the vehicle as well as an unattractive appearance.

OBJECTS OF THE INVENTION

It is accordingly an object of the present invention to provide an improved and novel vehicle body construction of the type having a back door assembly and which is free from the foregoing drawbacks inherent in the prior art vehicle body construction of the described type.

It is another object of the present invention to provide a vehicle body construction of the above-mentioned character which is constructed to effect the reduction in width of the frame of the back door assembly, thereby providing an increased vision area of a glass panel of the back door assembly as well as an improved appearance.

It is a further object of the present invention to provide a vehicle body construction of the above-mentioned character which is adapted to be obtained on the basis of a vehicle body construction of the type adapted to have a fixed rear window in order to make use of the parts and manufacturing processes of the latter vehicle body construction as much as possible, whereby the marked cost reduction of the vehicle body of this invention is effected.

It is a still a further object of the present invention to provide a method of obtaining a vehicle body construction of the above mentioned character on the basis of a vehicle body construction of the type adapted to have a fixed rear window.

BRIEF DESCRIPTION OF THE DRAWINGS

These and other objects and advantages of the present invention will be more apparent from the ensuing description, reference being had to the drawings, in which like parts will be designated by like reference numerals and in which.

DETAILED DESCRIPTION OF THE PREFERRED EMBODIMENTS

Referring first to FIGS. 7 to 10 inclusive, a preferred embodiment of this invention will be described.

Figure 7:
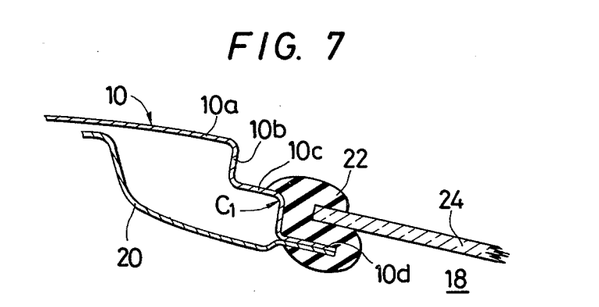
FIGS. 7 and 9 are cross sectional views taken in a similar manner to FIGS. 3 and 5, respectively, showing a vehicle body construction of the type having a fixed rear window on the basis of which the vehicle body construction of this invention is obtained.
Figure 8:
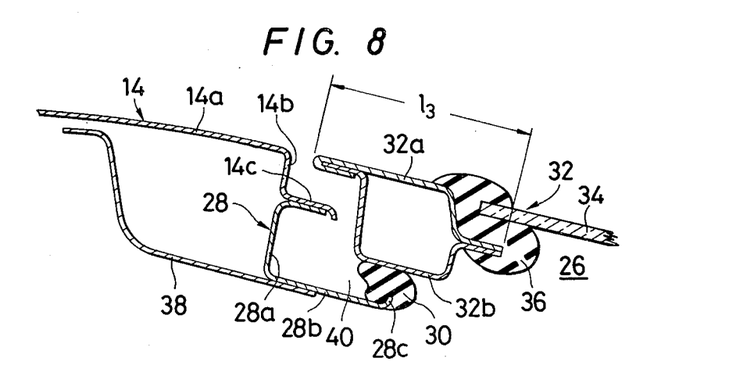
FIGS. 8 and 10 are cross sectional views taken in a similar manner to FIGS. 4 and 6, respectively, showing an embodiment of a vehicle body construction of this invention.
Figure 9:
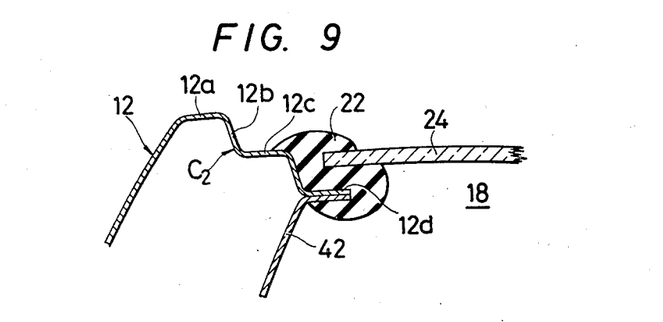
Figure 10:
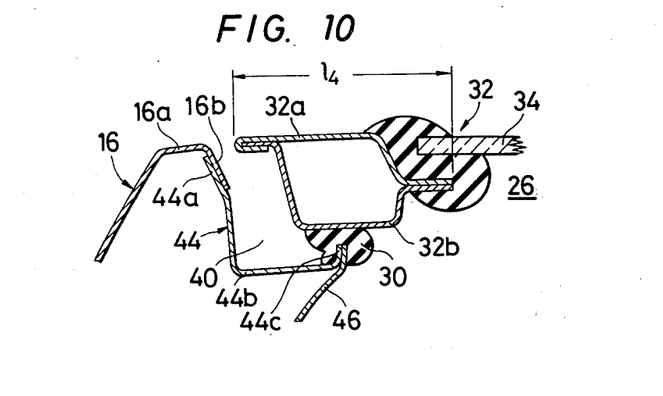

FIGS. 7 and 9 show a vehicle body construction of the type having a fixed rear window, that is, a part thereof including a roof panel 10 and a part therof including a rear fender outer panel 12, respectively. FIGS. 8 and 10 show a vehicle body construction of this invention and of the type having a back door assembly, that is, a part thereof including a roof panel 14 and a part thereof including a rear fender outer panel 16, respectively. The vehicle body construction of this invention shown in FIGS. 8 and 10 is adapted to be obtained on the basis of the vehicle body construction of FIGS. 7 and 9 as will be understood as the description proceeds.

Referring particularly to FIG. 7, the roof panel 10 is seen to have an outer exterior portion 10a defining the outer body of the vehicle, a stepped flange portion 10b having a shoulder 10c and projecting inwardly from the outer exterior portion 10a and defining a side of rear window-receiving opening 18, and a bottom wall portion 10d extending substantially perpendicularly from the flange portion 10b into the rear window-receiving opening 18. The roof panel 10 is welded at the bottom wall portion 10d to a roof rail 20 and securely fitted thereat with a weather strip 22 which is in turn securely fitted to the periphery of a rear window glass panel 24. This roof panel 10 is shaped so that when the flange portion 10b is partially cut off, together with the bottom wall portion 10d, at the point $C_1$ from the remainder including the shoulder 10c, it has exactly the same shape as that of the roof panel 14 employed in the vehicle body construction of FIG. 8.

With reference particularly to FIG. 8, the roof panel 14, which is shaped so as to be obtained by modifying the roof panel 10 of FIG. 7 in the above-mentioned manner, is seen to have an outer exterior portion 14a defining the outer body of the vehicle and a flange portion 14b having a shoulder 14c and projecting inwardly from the outer exterior portion 14a and defining a side of a back door-receiving opening 26. To the shoulder 14c of the flange portion 14b is welded a support member 28 which includes a side wall portion 28a extending inwardly from the flange portion 14b of the roof panel 14 and a bottom wall portion 28b extending perpendicularly from the side wall portion 28a into the back door-receiving opening 26. The support member 28 is fitted, at its free end 28c, with a weather strip 30 for engagement with a frame 32a of a back door assembly 32. The back door assembly 32 is movable between a raised position and a lowered position and has a glass panel 34 which is securely fitted to the frame 32a by way of a weather strip 36. There is also provided a roof rail 38 which is welded at one end thereof to the support member 28. In this instance, it should be noted that the support member 28 is constructed and arranged so as to cooperate with the flange portion 14b of the roof panel 14, the weather strip 30 and the frame 32a of the back door assembly 32 to define a drip trough 40 the depth of which is larger than its width. That is, as compared with the drip trough 3 of FIG. 4, the drip trough 40 is relatively increased in depth and reduced in width, securing a sufficiently large cross sectional area. It should be further noted that the frame 32a of the back door assembly 32 is designed to have a box-like section including a bottom side 32b and to engage the weather strip 30 at the wall portion defining the bottom side 32b when the back door 32 is in the lowered position thereof. With this structure, since such thin flat portion 5b in the case of the back door assembly 5 of FIG. 4 is dispensed with, the width $l_3$ of the frame 32a of the back door assembly 32 is reduced markedly without causing a reduction in its rigidity, thus resulting in an increased vision area of the glass panel 34 and therefore an improved visibility as well as an improved appearance.

Referring particularly to FIG. 9, the rear fender outer panel 12, which extends consecutively from the roof panel 10 of FIG. 7, is seen to have an outer exterior portion 12a defining the outer body of the vehicle, a stepped flange portion 12b having a shoulder 12c and projecting inwardly from the outer exterior portion 12a and defining a side of the rear window-receiving opening 18, and a bottom wall portion 12d extending from the flange portion 12b into the rear window receiving opening 18. The shoulder 12c and the bottom wall portion 12d extend, of course, in coplanar relationship with those of the roof panel 10 of FIG. 7. The rear fender outer panel 12 is welded at the bottom wall portion 12d to a rear fender inner panel 42 and fixedly supports thereat the glass panel 24 by way of the weather strip 22. This rear fender outer panel 12 is shaped so that when the flange portion 12b is partially cut off, together with the bottom wall portion 12d, at the point $C_2$ from the remainder not including the shoulder 12c, it has exactly the same shape as that of the rear fender outer panel 16 of FIG. 10.

Referring particularly to FIG. 10, the rear fender outer panel 16, which is shaped so as to be obtained by modifying the rear fender outer panel 12 in the above-mentioned manner, is seen to have an outer exterior portion 16a defining the outer body of the vehicle and a flange portion 16b projecting inwardly from the outer exterior portion 16a and defining a side of the back door-receiving opening 26. To the flange portion 16a of the rear fender outer panel 16 is welded a support member 44 which as a side wall portion 44a extending inwardly from the flange portion 16a and a bottom wall portion 44b extending perpendicularly from the side wall portion 44a into the back door-receiving opening 26. The support member 44 is further welded at 44c to a rear fender inner panel 46 and fitted thereat with the weather strip 30 for engagement with the frame 32a of the back door assembly 32. In this instance, it should be noted that the support member 44 is constructed and arranged so as to cooperate with the flange portion 16b of the rear fender outer panel 16, the weather strip 30 and the frame 32a of the back door assembly 32 to define a drip trough 40 the depth of which is larger than its width. That is, compared with the drip trough 3 of FIG. 6, the drip trough 40 is increased in depth and reduced in width, securing a sufficiently large cross sectional area. It should be further noted that the frame 32a of the back door assembly 32 is designed to have a box-like section including a bottom side 32b and to engage the weather strip 30 at the wall portion defining the bottom side when the back door assembly is in the lowered position thereof. With this structure, since such thin, flat portion 5b of the back door assembly 5 of FIG. 6 is dispensed with, the width $l_4$ of the frame 32a of the back door assembly 32 is reduced markedly without causing a reduction in its rigidity, thus resulting in an increased vision area of the glass panel 34 and therefore an improved visibility as well as an improved appearance.

Figure 11:
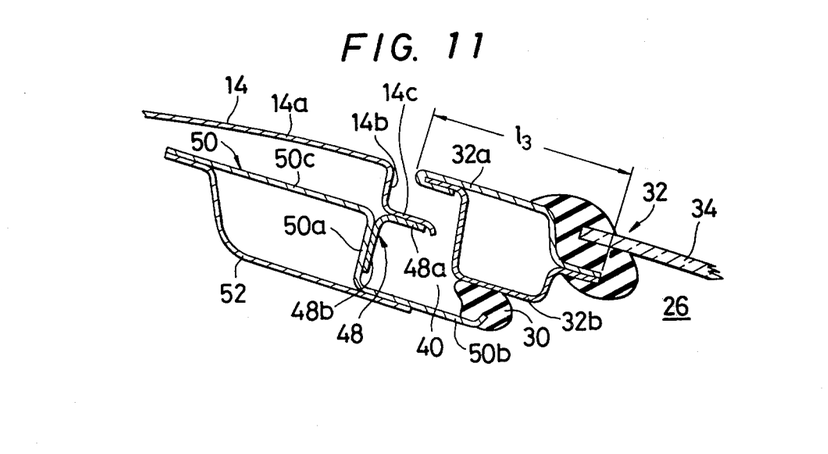
FIG. 11 is a view similar to FIG. 8 but showing a modified embodiment of this invention.

Referring to FIG. 11, a modification of the vehicle body construction of FIG. 8 will be explained.

The vehicle body construction of FIG. 11 mainly differs from that of FIG. 8 in that a connecting member 48 is provided to connect a support member 50 to the roof panel 14 instead of the arrangement of FIG. 8 in which the support member 28 is directly welded to the roof panel 14. That is, the connecting member 48 with an L-shaped cross section is welded at one leg portion 48a to the flange portion 14b of the roof panel 14 and at the other leg portion 48b to the support member 50. The support member 50 is substantially similar to the support member 28 of FIG. 8 except that it has, in addition to a side wall portion 50a and a bottom wall portion 50b, an extension wall portion 50c which extends substantially perpendicularly from the side wall portion 50a in the direction opposite to the back door-receiving opening 26. The support member 50 is connected at one end of the extension wall portion 50c to a roof rail 52 in a manner to define therewith a box-shaped section. The vehicle body construction of FIG. 11 effects an increased rigidity of the rear peripheral portion of the roof panel 14.

Figure 12:
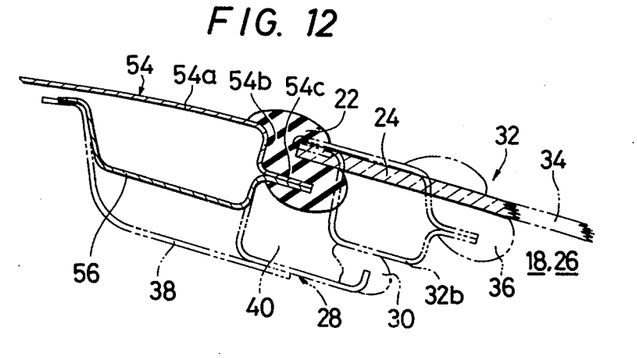
FIGS. 12 and 13 are views showing a modification of the vehicle body construction of FIGS. 7 and 9 and another embodiment of this invention.
Figure 13:
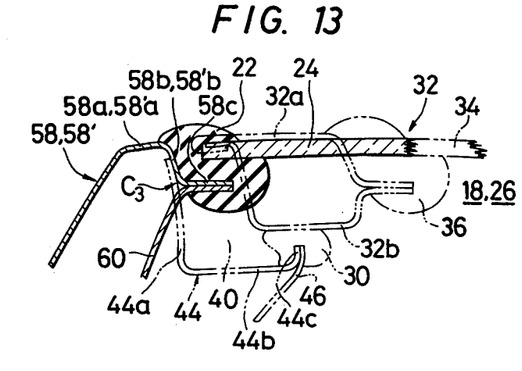

Referring to FIGS. 12 and 13, another embodiment of this invention will be described.

There is shown in FIG. 12 a part of a vehicle body construction of the type having a fixed rear window, that is, the part including a roof panel 54. The roof panel 54 is seen to have an outer exterior portion 54a defining the outer body of the vehicle, a flange portion 54b projecting inwardly from the outer exterior portion 54a and defining a side of the rear window-receiving opening 18, and a bottom wall portion 54c extending substantially perpendicularly from the flange portion 54b into the rear window receiving opening 18. The roof panel 54 is welded at the bottom wall portion 54c to a roof rail 56 and fixedly supports thereat the glass panel 24 by way of the weather strip 22. In this instance, it is to be noted that, as compared with the roof panel 10 of FIG. 7, the flange portion 54b is relatively plainly shaped i.e., not having a shoulder, and the bottom wall portion 54c is located closer to the outer exterior portion 54a.

There is also shown in FIG. 12 a part of a vehicle body construction of the type having a back door assembly, that is, the part including a roof panel 54 which has exactly the same shape as that of the vehicle body construction of the type having a fixed rear window. The vehicle body construction of the type having a back door assembly shown in FIG. 12 is substantially similar to that of FIG. 8.

In this instance, it is to be noted that the two types of vehicle body constructions in FIG. 12 are adapted to make use of the same roof panels 54.

There is shown in FIG. 13 a part of a vehicle body construction of the type having a fixed rear window, that is, the part including a rear fender outer panel 58. The rear fender outer panel 58, which extends consecutively from the roof panel 54 of FIG. 12, has an outer exterior portion 58a defining the outer body of the vehicle, a flange portion 58b projecting inwardly from the outer exterior portion 58a and defining a side of the rear window-receiving opening 18, and a bottom wall portion 58c extending from the flange portion 58b into the rear window-receiving opening 18. The rear fender panel 58 is welded at the bottom wall portion 58c to a rear fender inner panel 60 and fixedly supports thereat a window glass 24 by way of a weather strip 22.

There is also shown in FIG. 13 a part of a vehicle body construction of the type having a back door assembly, that is, the part including a rear fender outer panel 58′. The rear fender outer panel 58′ is substantially similar to the rear fender outer panel 58 except for a cut being made at the point $C_3$ so as not to have a wall portion corresponding to the bottom wall portion 58c. The rear fender outer panel 58′ thus includes an outer exterior portion 58′a and a flange portion 58′b to which a support member 44 is welded. The support member 44 is similar to that of FIG. 10.

With the above structure and arrangement, it is to be noted that the rear fender outer panel 58 for a vehicle body construction of the type having a fixed rear window can be changed into the rear fender outer panel 58′ for a vehicle body construction of the type having a back door assembly by cutting off the bottom wall portion 58c at the point $C_3$. It is to be further noted that this embodiment produces the same effect as the embodiment of FIGS. 8 and 10.

Figure 14:
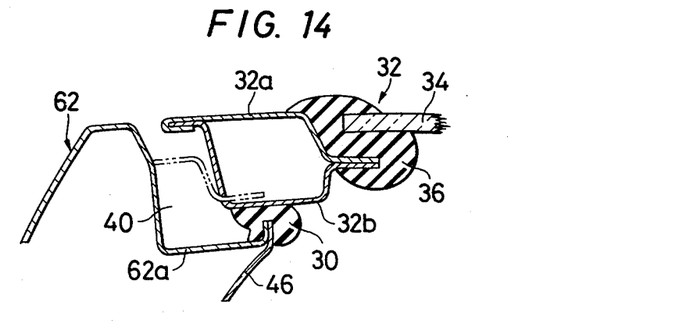
FIG. 14 is a view similar to FIG. 10 but showing a further embodiment of this invention.

Referring to FIG. 14, a further embodiment of this invention will be described.

FIG. 14 shows a part of a vehicle body construction of the type having a back door assembly, that is, the part including a rear fender outer panel 62. The vehicle body construction shown in FIG. 14 is substantially similar to that of FIG. 10 except that the rear fender outer panel 62 is integrally formed with a support member of a wall portion 62a corresponding in shape to the support member 44 of FIG. 10, that is, the rear fende outer panel 62 has pressed integral therewith the wall portion 62a, as will be explained hereinafter. The vehicle body construction of FIG. 14 produces the same effect as that of FIG. 10.

The common use of manufacturing processes with respect to the foregoing two types of vehicle body constructions will now be described.

Figure 15:
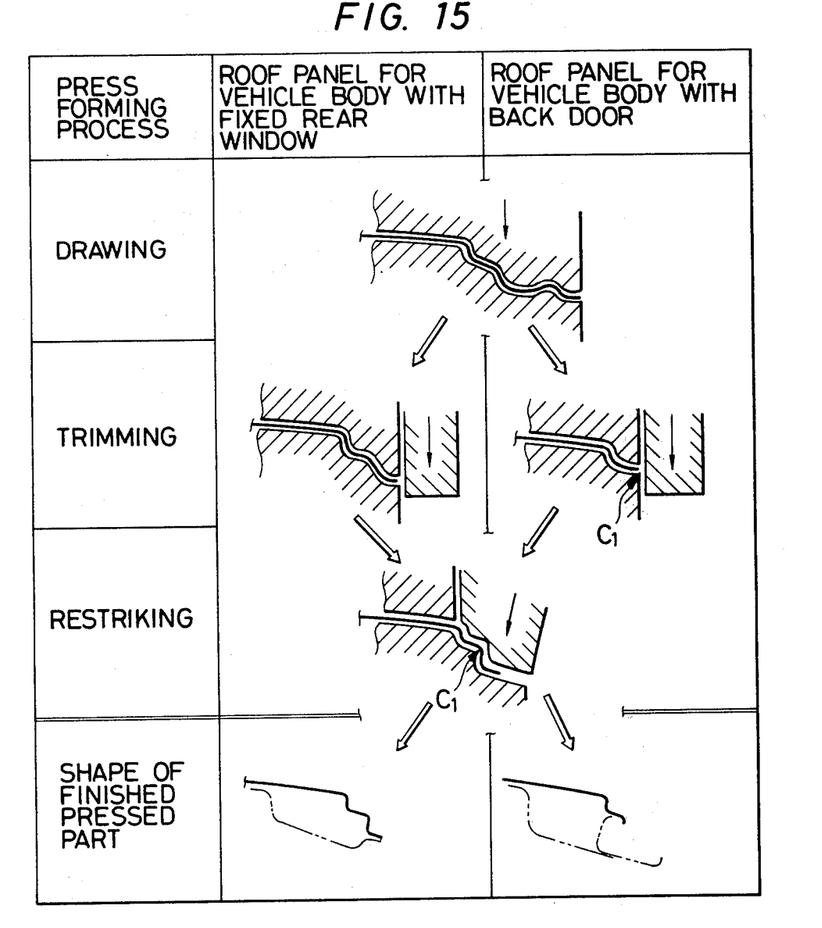
FIG. 15 is a diagram showing the press-forming processes of two kinds of roof panels which are respectively employed in a vehicle body construction of this invention and another vehicle body construction on the basis of which the vehicle body construction of this invention is obtained.

Description is first made with respect to the roof panels 10 and 14 respectively shown in FIGS. 7 and 8. The press-forming processes of the roof panels 10 and 14 are diagrammatically shown in FIG. 15. As seen from this diagram, the roof panels 10 and 14 are formed by the common use of a draw die and a restriking die. Only the trimming processes require different trimming dies since the roof panel 14 must be trimmed so as to have a terminal end located at the point $C_1$ when restruck. The workpiece shown in the restriking die of FIG. 15 is in fact a roof panel 10. In the case of the roof panel 14, the workpiece would terminate at the point $C_1$.

Description is further made by way of example to the rear fender outer panels 16 and 62 respectively shown in FIGS. 10 and 14. The press-forming processes of the rear fender outer panels 16 and 62 are diagrammatically shown in FIG. 16. As seen from this diagram, the rear fender outer panels 16 and 62 are formed by the common use of a draw die and a restriking die. Only the trimming processes and restriking processes require different trimming dies and restriking dies.

In the case where the rear fender outer panels 58 and 58' of FIG. 13 are respectively employed in the foregoing different two types of vehicle body constructions, the common use of a flanging die as well as a draw die and a restriking die is attained.

Figure 16:
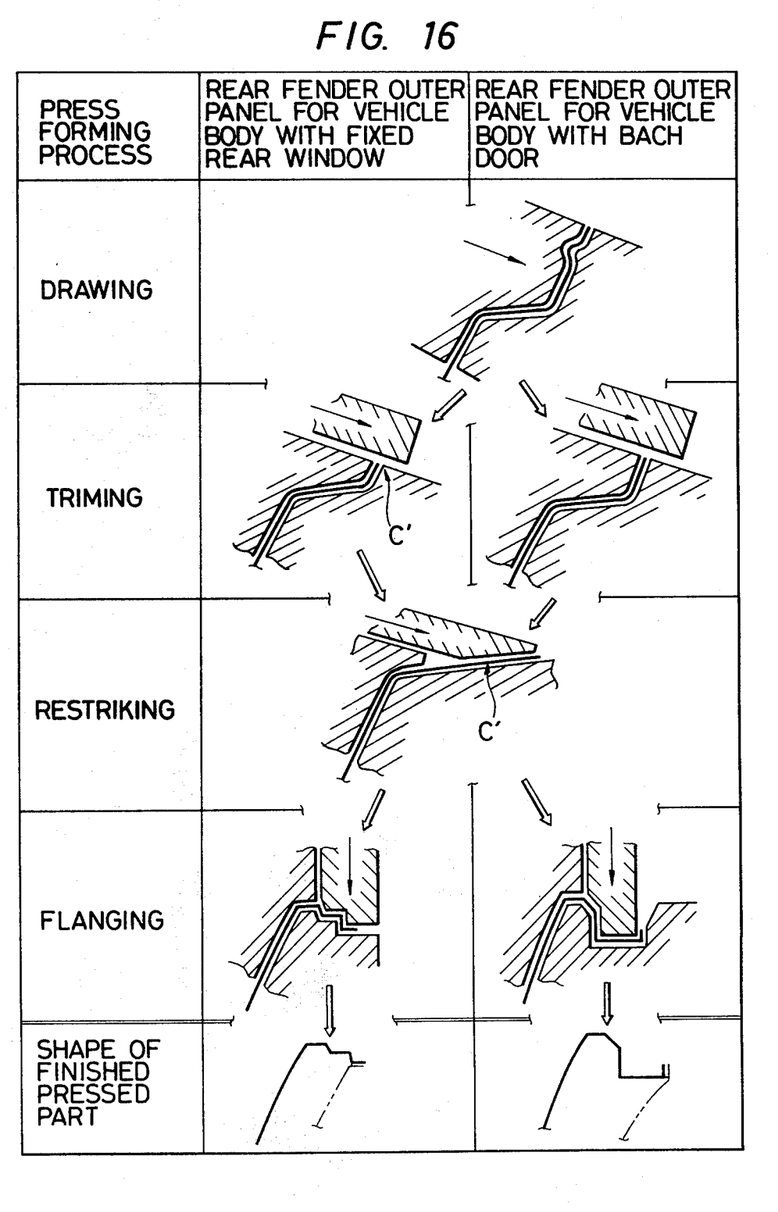
FIG. 16 is a diagram showing the press-forming processes of two kinds of rear fender outer panels which are respectively employed in a vehicle body construction of this invention and another vehicle body construction on the basis of which the vehicle body construction of this invention is obtained.

The workpiece shown in the restriking die of FIG. 16 is the rear fender outer panel 62 in an unfinished condition. In the case of the rear fender outer panel 16, the workpiece would terminate at the point C'.

What is claimed is:

1. A vehicle body construction having a back door receiving opening, comprising:
    a roof panel having an outer exterior portion defining the body of the vehicle and a flange portion projecting inwardly therefrom;
    a rear fender outer panel extending consecutively from said outer roof panel and having an outer exterior portion defining the outer body of the vehicle and a flange portion projecting inwardly therefrom;
    said flange portions of the outer roof panel and the rear fender outer panel defining sides of said receiving opening;
    a first support member having a side wall portion inward from the flange portion of said roof panel and a bottom wall portion extending substantially perpendicularly from said side wall portion into said receiving opening;
    a second support member having a side wall portion extending inwardly from the flange portion of said rear fender outer panel and a bottom wall portion extending substantially perpendicularly from said side wall portion into said receiving opening;
    a back door assembly movable between a raised position and a lowered position and having a frame positioned adjacent the bottom wall portions of said first and second support members when the back door assembly is in the lowered position;
    a weather strip between said frame and said bottom wall portions to form a seal therebetween when the back door assembly is in the lowered position;
    in which said support members are constructed and arranged so as to cooperate with said flange portions, said weather strip and said frame to define a drip trough the depth of which is larger than its width; and
    in which said frame is so constructed and arranged to have a box-like section including a bottom side and to engage said weather strip at the wall portion defining said bottom side.

2. A vehicle body construction as claimed in claim 1, in which said first support member is welded at the side wall portion thereof to the flange portion of said roof panel.

3. A vehicle body construction as claimed in claim 1, in which said second support member is welded at the side wall portion thereof to the flange portion of said rear fender outer panel.

4. A vehicle body construction as claimed in claim 1, in which said rear fender outer panel is integrally formed with said second support member.

5. A vehicle body construction as claimed in claim 1, further comprising a connecting member with an L-shaped cross section by way of which said first support member is welded to said roof panel.

6. A vehicle body construction as claimed in claim 5, further comprising a roof rail, in which said first support member further comprises an extension wall portion extending substantially perpendicularly from said side wall portion in the direction opposite to said receiving opening and in which said first support member is welded at both the bottom wall portion and the extension wall portion thereof to said roof rail defining therebetween a box-shaped section.

7. A method of obtaining a vehicle body construction adapted for having a back door assembly on the basis of a vehicle body construction adapted for having a fixed rear window, in which the vehicle body construction adapted for having a fixed rear window, includes: a roof panel having an outer exterior portion defining the outer body of the vehicle, a flange portion projecting inwardly from the outer exterior portion and a bottom wall portion extending transversely from said flange portion; a rear fender outer panel having an outer exterior portion, defining the outer body of the vehicle, a flange portion projecting inward from the outer exterior portion and a bottom wall portion extending transversely from the flange portion thereof; said flange portions of the roof panel and the rear fender outer panel defining sides of a rear window-receiving opening; and said bottom wall portions of the roof panel and the rear fender outer panel being arranged to extend into said receiving opening, the method comprising the steps of:
    preparing first and second support members each of which has a side wall portion and a bottom wall portion extending substantially perpendicularly from said side wall portion;
    attaching said first support member to said roof panel in such a manner that the side wall portion of the first support member extends inwardly from the flange portion of the roof panel and that the bottom wall portion of the first support member extends into the receiving opening;
    cutting the bottom wall portion of said rear fender outer panel off same;
    attaching said second support member to the flange portion of said rear fender outer panel in such a manner that the side wall portion of said second support member extends inwardly from the flange of the rear fender outer panel and that the bottom wall portion of said second support member extends into said receiving opening; and
    arranging a back door assembly in a manner to be sealingly engageable with the bottom wall portion of said first and second support members by way of a weather strip.

8. A method of obtaining a vehicle body construction adapted for having a back door assembly as claimed in claim 7, in which said back door assembly comprises a frame constructed to have a box-like section including a bottom side and in which said back door assembly is arranged to engage said weather strip at the wall portion defining said bottom side.

9. A method of obtaining a vehicle body construction adapted for having a back door assembly as claimed in claim 7, in which the attachment of the first support member to the roof panel is made by welding the first support member to the bottom wall portion of the roof panel.

10. A method of obtaining a vehicle body construction adapted for having a back door assembly as claimed in claim 7, in which the attachment of the second support member to the rear fender outer panel is made by welding.

11. A method of obtaining a vehicle body construction adapted for having a back door assembly as claimed in claim 7, in which each of the flange portions of the roof panel and the rear fender outer panel has a stepped configuration forming a shoulder, and in which the attachment of the first support member to the roof panel is made by partially cutting the flange portion of the roof panel together with the bottom wall portion off the remainder including the shoulder and welding the first support member to the shoulder of the flange portion, and in which the attachment of the second support member to the rear fender outer panel is made by further cutting partially the flange portion of the rear fender outer panel together with the bottom wall portion off the remainder without the shoulder and welding the second support member to the flange portion of the rear fender outer panel.

12. A method of obtaining a vehicle body construction adapted for having a back door assembly as claimed in claim 7, in which the attachment of the first support member to the roof panel is made by welding the first support member, by way of a connecting member with an L-shaped cross section, to the bottom wall portion of the roof panel.

* * * * *